United States Patent
Takahashi (10) Patent No.: US 8,850,686 B2
(45) Date of Patent: Oct. 7, 2014

(54) METHOD FOR PATTERNING SURFACE OF METAL OBJECT AND THE METAL OBJECT

(75) Inventor: Masaki Takahashi, Tokyo (JP)

(73) Assignee: Mokumeganeya Co., Ltd., Tokyo (JP)

(*) Notice: Subject to any disclaimer, the term of this patent is extended or adjusted under 35 U.S.C. 154(b) by 273 days.

(21) Appl. No.: 13/537,356

(22) Filed: Jun. 29, 2012

(65) Prior Publication Data

US 2013/0004789 A1 Jan. 3, 2013

(30) Foreign Application Priority Data

Jun. 30, 2011 (JP) ................. 2011-145208

(51) Int. Cl.
*B44C 1/22* (2006.01)
*B32B 15/01* (2006.01)
*B21C 37/02* (2006.01)
*B44C 3/00* (2006.01)

(52) U.S. Cl.
CPC ............. *B21C 37/02* (2013.01); *B44C 3/005* (2013.01); *B32B 15/01* (2013.01); *B44C 1/227* (2013.01); *B44C 1/228* (2013.01)
USPC ........................................ 29/557; 29/896.412

(58) Field of Classification Search
CPC ............. B21C 37/02; B21J 1/025; B21J 1/04; B21K 1/761; B21K 11/02; A44C 9/00; A44C 9/0023; B23P 15/00; B32B 15/01; B32B 15/018
USPC .......... 29/557, 896.412; 72/46, 363; 428/172, 428/596 M, 601
See application file for complete search history.

(56) References Cited

U.S. PATENT DOCUMENTS 8,590,357 B2 * 11/2013 Takahashi .............. 72/371
8,661,682 B2 * 3/2014 Takahashi .............. 29/896.412

FOREIGN PATENT DOCUMENTS

JP 2003-052425 A 2/2003

* cited by examiner

*Primary Examiner* — Alexander P Taousakis
(74) *Attorney, Agent, or Firm* — Cermak Nakajima McGowan LLP; Tomoko Nakajima (57) ABSTRACT

On the surface of the spread multi-layered metal object, as reaches from outside to inside of step-wise, the pattern shaped concave is formed by reaching the lower layer of metal layer of the metal layer. The concave is formed as step-wise, the innermost reaches inside of the metal layer from the surface, the outer reaches the top of the metal layer from the surface, and the outermost reaches the top of the metal layer. The metals removed to form the concave remains inside and effectively control on the pattern part obtained at the end. As a result, able to form desired pattern stably.

7 Claims, 6 Drawing Sheets

METHOD FOR PATTERNING SURFACE OF METAL OBJECT AND THE METAL OBJECT

This application is claims priority under 35 U.S.C. §119 to Japanese Patent Application No. 2011-145208, filed Jun. 30, 2011, which is incorporated in its entirety by reference.

FIELD OF INVENTION

This invention relates to a method for patterning surface of metal object and the metal object.

BACKGROUND

The method of forming patterns such as letters, symbols and shapes on the surface of the metal object of the metal ornaments, such as rings or pendants, will be explained. Namely, there is a method of forming pattern on the metal surface by stamping and engraving. There is another method of forming pattern by corroding the pattern parts or non-pattern parts on the metal surface. These methods form the pattern on the surface of the metal object by varying the height of the surface of the metal object of non-pattern parts and pattern parts.

As an alternative, to form the patterns, fitting metal parts made of different materials into the concave of pattern parts formed by stamping, or pouring molten metal of different materials into the concave (reference: Patent Document 1). This method is to form the patterns on the surface of the metal object using differences in colors and luster between the metal object pattern formed on the surface and the metals fitting or pouring into the concave to make patterns.

The aforementioned method of pattern forming using difference of colors is differ from the method of pattern formation by differentiate the heights of the surface of the metal object. The heights of the surface of the metal object are definite after patterns formed and maintaining a plane of the surface of the metal. Therefore, the latter method has a different aesthetic from a method forming patterns by differentiate the heights of the surface.

However, a method of inserting the metal parts patterned shape is required high machining accuracy in the process of the pattern forming. Also, machining accuracy is limited, therefore it is difficult to form patterns with high aesthetic on the surface of the metal. Furthermore, when the patterns are complex, the method of pouring molten metal is difficult to form the precise patterns because the metals are not able to be poured in the detail of the pattern shape concave. Therefore, it is difficult to form patterns with high aesthetic on the surface of the metal object.

SUMMARY OF THE INVENTION

The present invention has been made in view of these problems, and purpose is to provide technology with more accurate and high aesthetic pattern forming while maintaining a plane of the surface of the metal after patterns formed.

A first present invention is a method for patterning a surface of a metal object comprising:
a laminating step laminating a plurality of metal plates;
a junction step jointing the plurality of metal plates to form a multi layer metal object in which a plurality of metal plates are laminated;
a pattern forming step for removing a surface of the multi layer metal object and forming the concave of a predetermined pattern shape to reach a predetermined metal plate; and
a forming plane step pressing the surface of a non-pattern part of the multi layer metal object and making the surface height of the concave and the surface height of the non-pattern part uniform,
wherein the pattern forming step forms the concave to reach a lower metal layer among the plurality of metal plates as the concave approaches inward from the stepped outside.

Preferably in the first invention, the pattern forming step forms the concave so that the step height of the concave becomes smaller as the hardness of the metal layer forming the step becomes higher.

Preferably in the first invention, the pattern forming step forms the concave so that the step width of the concave becomes smaller as the hardness of the metal layer forming the step becomes higher.

Preferably the first invention further comprising a step shape determination step for calculating a ratio by dividing an index value by hardness of the layer where the concave is formed and determine shape of the step so that the area of the step becomes bigger as the ratio becomes bigger,
the ratio is calculated based on the hardness of the layer located in the lower layer of a stepped step of the plurality of metal plates,
wherein the pattern forming step forms the concave so that the step is formed in the shape determined by the step shape determination step.

Preferably in the first invention, the jointing the plurality of metal plates in the junction step is performed by diffusion joining or solder junction of the metal plates.

Preferably the first invention further comprising a twist step twisting the meal plates around an axis at right angles to the laminating direction of the metal plate.

Preferably in the first invention the pattern includes at least one of a letter, a sign and figure.

A second present invention is a metal object manufactured by a method,
the method comprising:
a laminating step laminating a plurality of metal plates;
a junction step jointing the plurality of metal plates to form a multi layer metal object in which a plurality of metal plates are laminated;
a pattern forming step for removing a surface of the multi layer metal object and forming the concave of a predetermined pattern shape to reach a predetermined metal plate so that the concaves reach a lower metal layer among the plurality of metal plates as the concave approaches inward from the stepped outside; and
a forming plane step pressing the surface of a non-pattern part of the multi layer metal object and making the surface height of the concave and the surface height of the non-pattern part uniform.

DETAILED DESCRIPTION OF THE INVENTION

Hereafter, the present embodiment of the invention will be explained by referring the drawings. It should note that, same reference letters or numerals are used to the same components in all the drawings, and detailed description will be appropriately omitted in the following description.

[First Embodiment]

Figure 1:
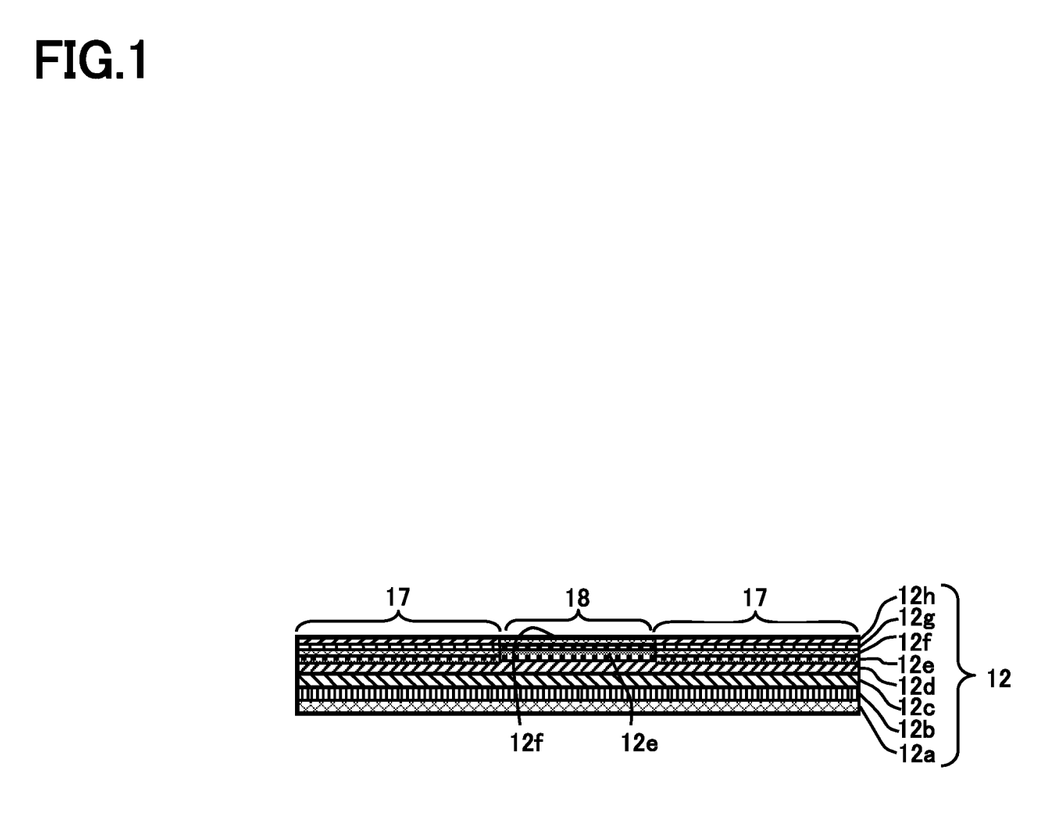
FIG. 1 is a schematic sectional view showing the configuration of the metal object relating to a first embodiment of the present invention.

FIG. 1 is a schematic sectional view showing the configuration of the metal object 10 relating to the embodiment of the present invention.

As shown in FIG. 1, the metal object 10 of the second embodiment is the metallic body laminated different materials metal layers 12 (12a to 12h). The two or more laminated metal layers 12 are joined together and the metal object 10 has become the multi-layered metal object 14. In addition, the metal object 10 has compressed parts compressed in the metal layer 12 direction and uncompressed parts. At the boundary between the surface of compressed parts and uncompressed parts, the metal layer 12 is discontinuous. Concretely, the metal layer 12 is exposed at the compressed parts, and the metal layer 12h and different material metal layer 12F are exposed at uncompressed parts. And, uncompressed parts form the pattern part 18 such as letters, symbols and shapes, and compress parts form the non-pattern part 17. Moreover, height of the compressed parts and uncompressed parts are same, therefore the surface of the metal object 10 is plane.

Hereafter, pattern formation step on the surface of the metal object relate to the embodiment in the present invention will be described.

In the present embodiment, the metal of pattern part 18 is removed, and pattern is formed on the surface of the metal object by pressing and forcing the non-pattern part 17.

Figure 2:
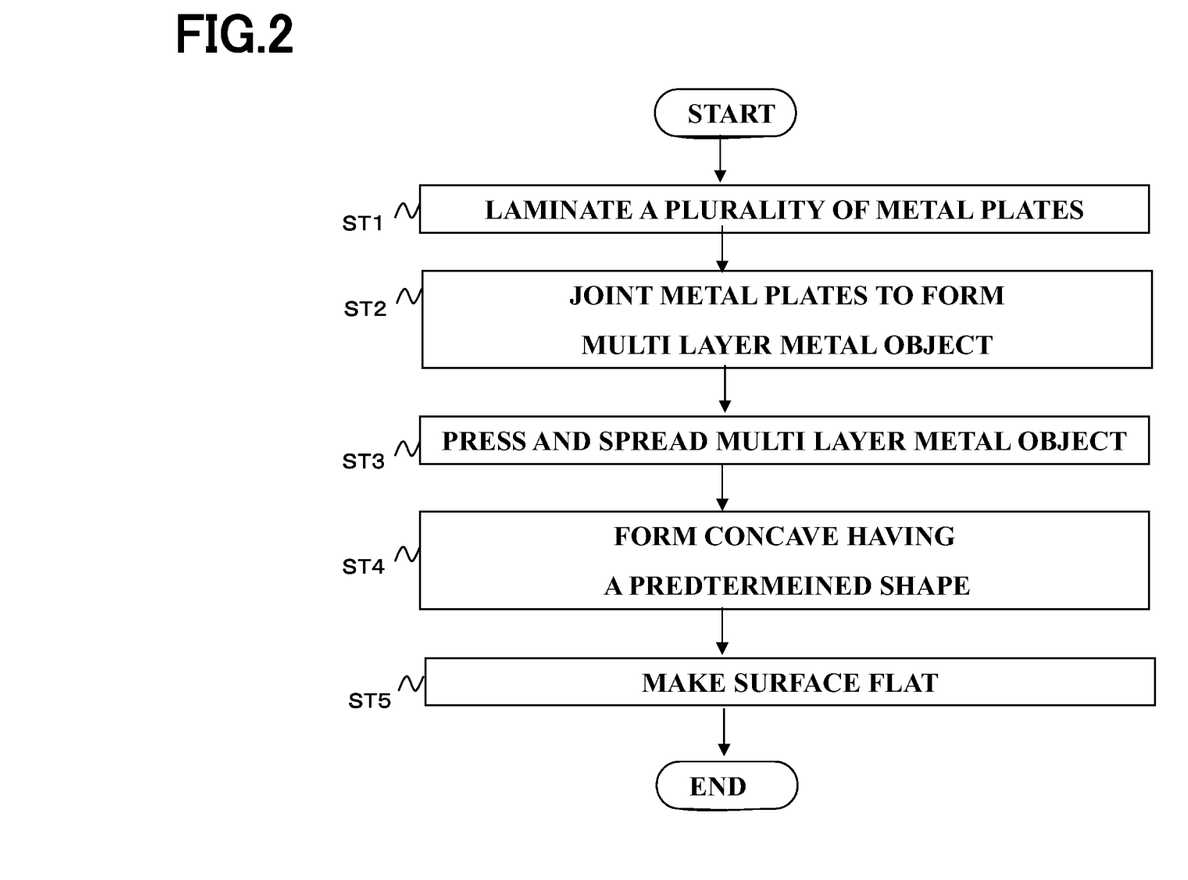
FIG. 2 is a flowchart for explain the flow of the method for forming patterns on the surface of metal object relate to the embodiment of the present invention.

FIG. 2 is a flowchart for explaining the flow of the method for forming patterns on the surface of metal object relating to the embodiment of the present invention. FIG. 3A to FIG. 3E are schematic sectional view for explain a method of pattern formation on the surface of metal object relating to the embodiment of the present invention.

Figure 3A:
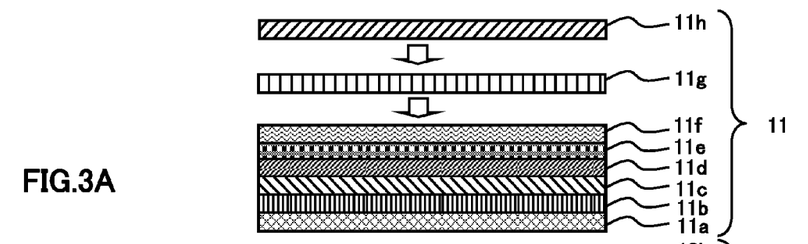
FIG. 3A to FIG. 3E are schematic sectional views for explain a method of pattern formation on the surface of metal object relate to the embodiment of the present invention.

Step ST1:

Firstly, as shown in FIG. 3A, Two or more metal plates with which the quality of the materials differs are laminated. As the material of a metal plate 11, platinum (Pt), gold (Au), silver (Ag), copper (Cu), brass, titanium (Ti), iron (Fe), nickel (Ni), stainless steel, tantalum (Ta), or these mixtures are used.

Two or more metal plates 11 are comprised the quality of material different, respectively, and character recognized visually, such as a color and a degree of gloss differs. The thickness of the metal plate 11 is about 0.3 to 1.0 mm. In addition, there should just be at least two kinds of the metal plates 11 which the quality of the materials differ.

Figures 3B, 3C:
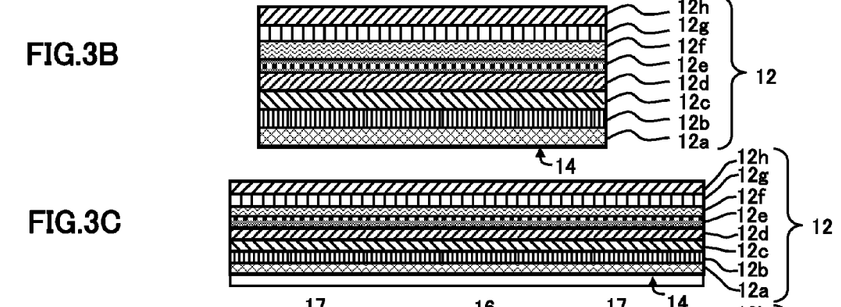

Step ST2:

Next, as shown in FIG. 3B, the multi-layered metal object 14 is formed by joining laminated two or more metal plates 11 and metal layer 12.

The metal layer 12 (12a to 12h) are formed by each metal plates 11 (11a to 11h).

To join together the metal plate 11, for example, stick the metal plate 11 on condition that the temperature of the metal plate is not more than the melting point, then pressurize the metal plate 11 to a level of plastic deformation do not occur, and diffusion junctions by using diffusion of atoms occur between metal plate 11.

The conditions at the time of performing diffusion junction are as follows.

Namely, it carries out by heating and pressurizing between 500 and 1200 degrees C. and between 200 and 500 kgf/cm2. In addition, junction of the metal plate 11 can also be done by solder junction.

Step ST3:

Next, as shown in FIG. 3C, the multi-layered metal object 14 is spread until predetermined thickness. More specifically, for example, the multi-layered metal object 14 is spread by inserting the multi-layered metal object 14 between two rollers set at predetermined intervals movably and pressure the surface. After this step, the multi-layered metal object 14 spread until about 0.5 to 2.0 mm.

Figure 3D:
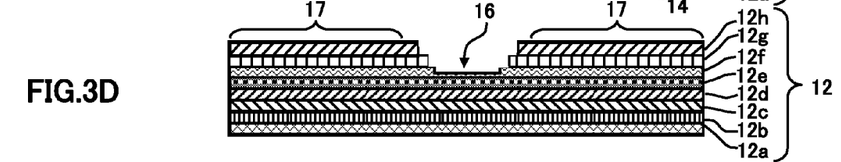

Step ST4:

Then, as shown in FIG. 3D, predetermined pattern shaped concaves 16 are formed on the surface of the multi-layered metal object 14 spread. To form the concave 16, for example, laser irradiation, sculpture and corrosion (etching) are used to remove metal parts from area of the concave shaped. By doing this, pattern shaped concave 16 is formed on the surface of the multi-layered metal object 14. The metal layer 12f is formed on the surface of concave 16, and the metal layer 12h and the metal layer 12f made of different materials are formed on the surface of the non-pattern part 17.

Hereafter, forming method of concave 16 will be explained in detail.

Namely, as shown in FIG. 3D, as approaches to the surface of the spread multi-layered metal object 14 from outside to inside of step-wise, the pattern shaped concave 16 is formed by reaching the lower layer of metal layer of the metal layers 12h, 12g and 12f.

Figure 3E:
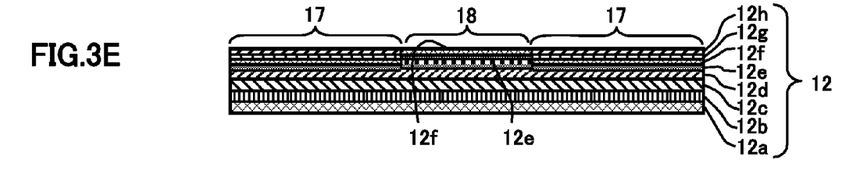
Figure 4:
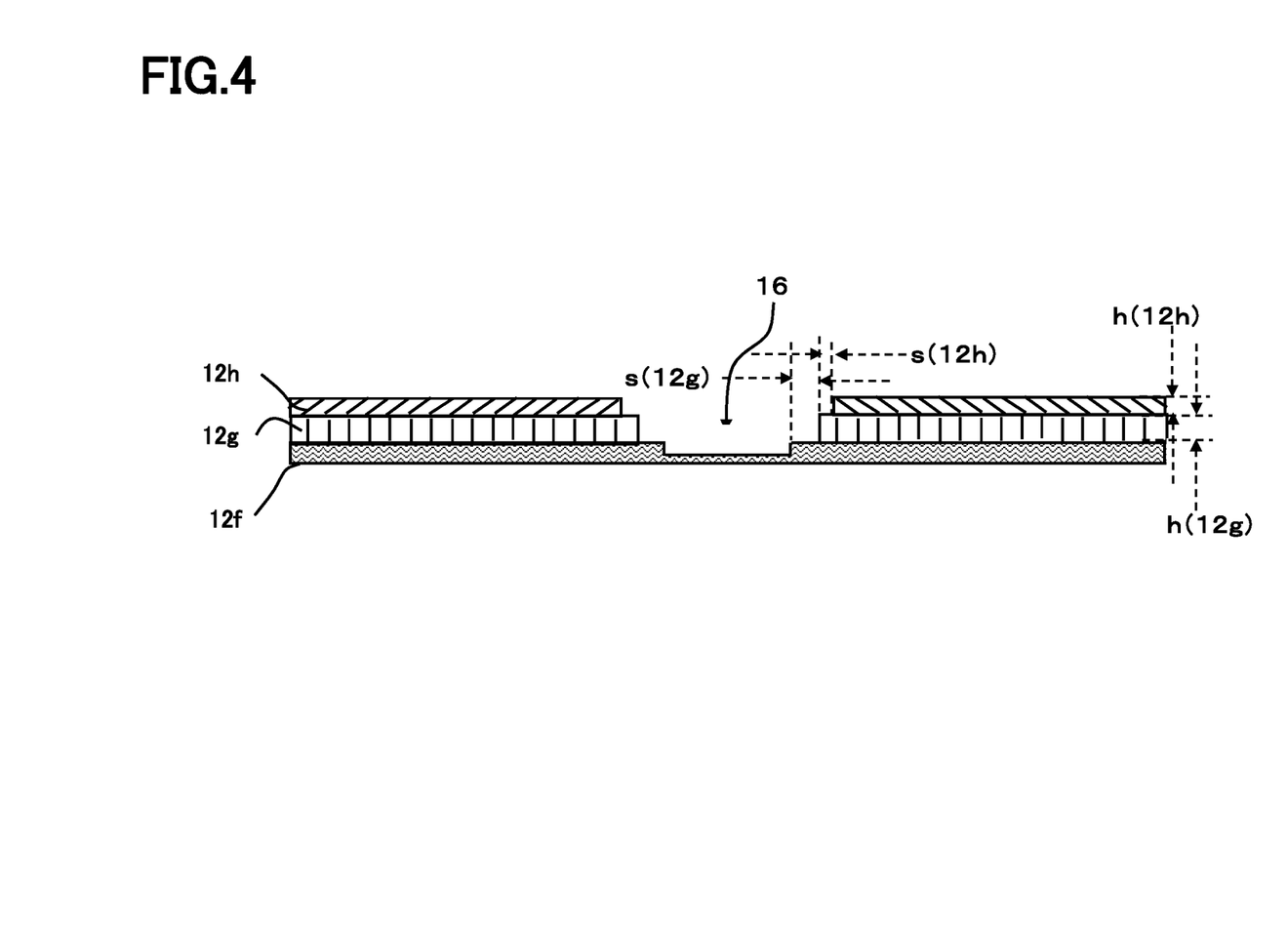
FIG. 4 is a view for explaining the other example of the first embodiment of the present invention.

As shown in FIG. 3 and FIG. 4, the concave 16 is formed as step-wise, the innermost reaches inside of the metal layer 12f from the surface, the outer reaches the top of the metal layer 12f from the surface, and the outermost reaches the top surface of the metal layer 12g.

By forming the concave 16 as stated above, metals removed to form the concave 16 remains inside and effectively control on the pattern part 18 obtained at the end. As a result, able to form desired pattern stably.

Also, as mentioned above, by forming concaves in stepwise pattern, gradation of the boundary between the pattern part 18 and the non-pattern part 17 gets smoother in the end, and can demonstrate superior design.

Figure 5:
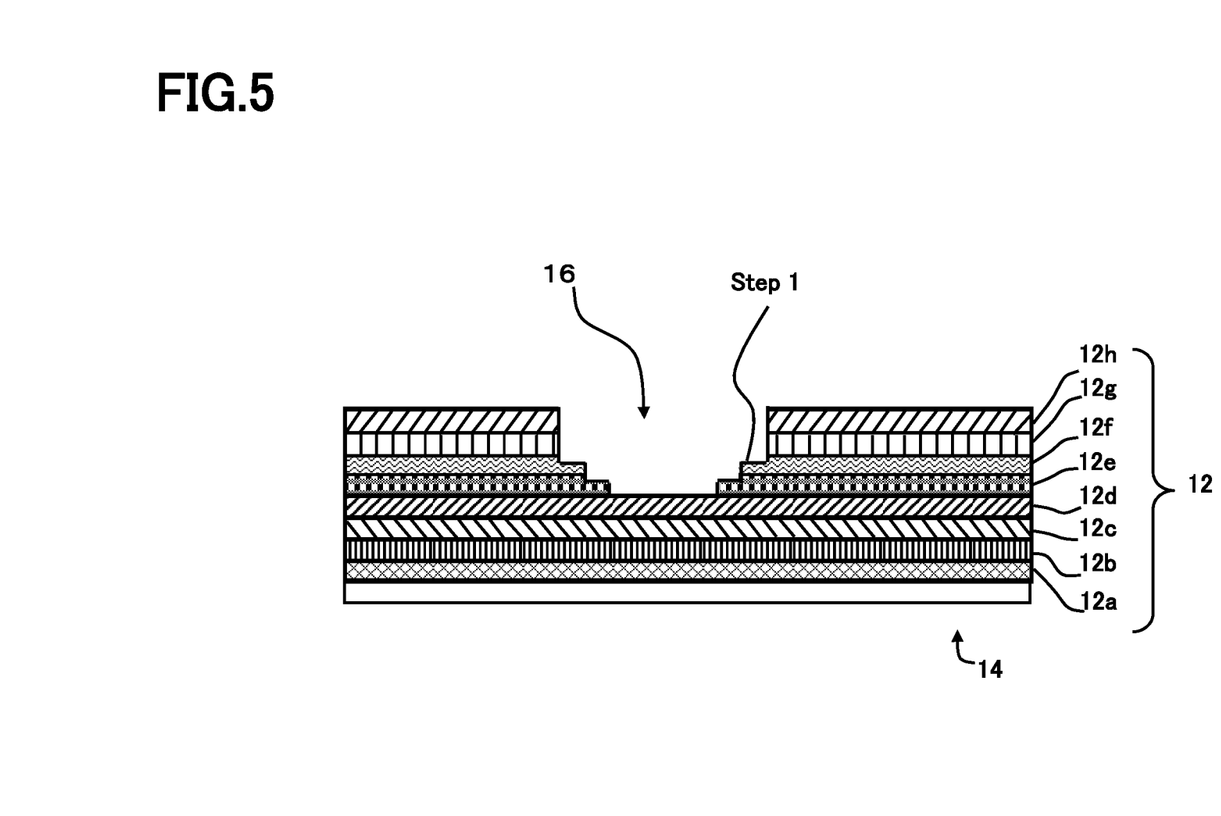
FIG. 5 is a view for explaining the other example of the first embodiment of the present invention.

Moreover, in the embodiment described above, the concaves are formed reaching the top of the metal layers 12f and 12g, however the concave may be formed as to cut into the layer of metals or to penetrate the inside of the metal layer. Also, as shown in FIG. 5, a difference in level can be formed over two or more the metal layer to form one step. In the example shown in FIG. 5, a level difference forms the step ST1 is formed over the metal layer 12h, 12g and 12f.

Figure 6:
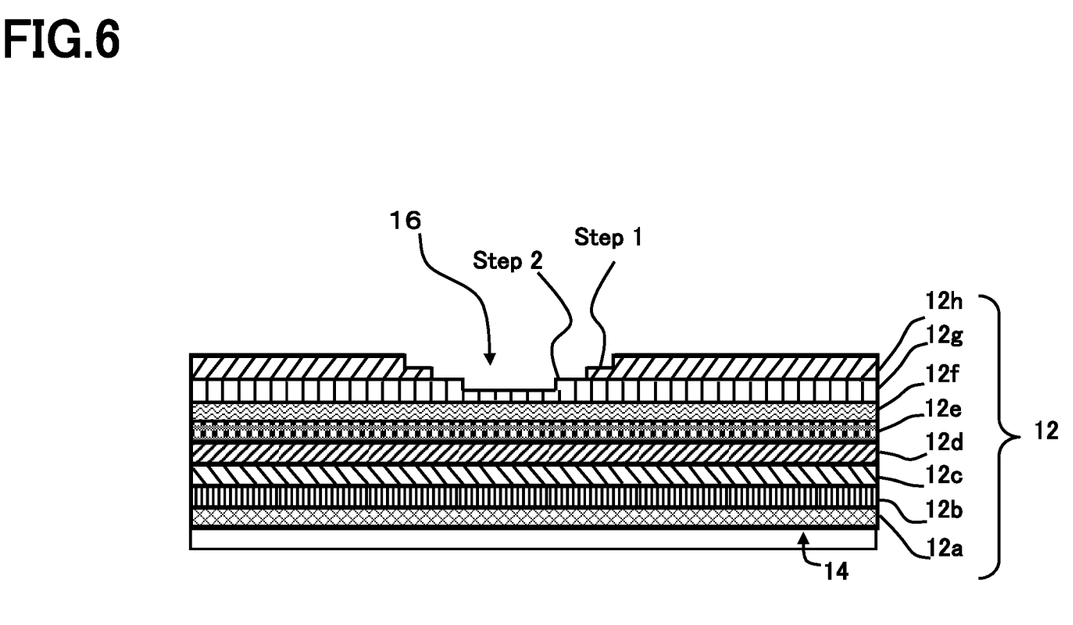
FIG. 6 is a view for explaining a second embodiment of the present invention.

Furthermore, as shown in FIG. 6, multiple steps may be formed in one metal layer. The number of steps is not particularly limited multiple as long as it is multiple. In the example shown in FIG. 6, two steps step 1 and 2 are formed on the metal layer 12h.

Flat side (Top view in FIG. 3) in the shape of the concave 16 is a stripe-shaped, circular or oval.

Step ST5:

Next, as shown in FIG. 3E, the height of the concave 16 and the non-pattern part 17 in the multi-layered metal object 14 should be the same. To make the surface of the multi-layered metal object 14 flat, the surface of the non-pattern part 17 is pressed. To press the surface of the multi-layered metal object 14 is performed by, for example, inserting the multi-layered metal object 14 between two rollers set at predetermined intervals movably. Hereby, metal layer 12 of non-pattern part 17 is compressed and cave in, the surface of the multi-layered metal object 14 become flat, and where concave 16 are formed become the pattern part 18 which is exposed metal layer 12. The boundary at the pattern part 18 and the non-pattern part 17, the metal layer 12 became discontinuous. In the present embodiment, the metal layer 12$h$ and the metal layer 12$f$ with different colors of the surface of non-pattern part 17 are exposed at pattern part 18. As a result, patterns are formed on the surface of the multi-layered metal object 14.

The predetermined patterns are formed on the surface of the metal object by taking steps described above.

According to the method of pattern forming on the surface of the metal object of the present embodiment, by forming the concave 16 as stated above, metals removed to form the concave 16 remains inside and effectively restrain on the pattern part 18 obtained at the end. As a result, able to form desired pattern stably. Moreover, according to the method of pattern forming on the surface of the metal object of the present embodiment, by forming concaves in step-wise pattern, gradation of the boundary between the pattern part 18 and the non-pattern part 17 gets smoother in the end, and can demonstrate superior design.

Furthermore, according to the method of pattern forming on the surface of the metal object of the present embodiment, the concave 16 is formed by laser irradiation, therefore more accurate pattern formation and high aesthetic pattern forming process can be done.

Moreover, according to the method of pattern forming on the surface of the metal object of the present embodiment, the surface of the non-pattern parts 17 are removed to make a plane surface of the multi-layered metal object 14, and patterns are formed by making the metal layer 12 discontinuous at the boundary between the pattern part 18 and the non-pattern part 17.

Therefore, compared to the method of fitting metal parts into the concave 16 or pouring molten metal, integrity gets higher at the boundary between the pattern part 18 and the non-pattern part 17.

Also, the surface of multi-layered metal object 14 is extremely precise plane. Therefore, high aesthetic pattern forming process can be done without high machining accuracy.

When pattern forming is processed by pouring molten different material metals into the concave 16, melting point of molten metal to pour and pattern made metal need to be different from a predetermined degree.

Hence, the metallic material can be used is limited. However, according to the method of pattern forming on the surface of the metal object of the present embodiment, melting point of metals are not needed to be different, so the metallic material can be used is not limited.

In addition, according to the method of pattern forming on the surface of the metal object of the present embodiment, able to combine different degree of color and gloss freely by changing the type of metals exposed in the pattern part 18 and the non-pattern part 17, Thus higher aesthetic pattern forming process can be done.

In addition, methods of fitting metal parts into the concave 16 or pouring molten metal, withdrawal and detachment from the concave 16 might occur due to friction or impact.

However, according to the method of pattern forming on the surface of the metal object of the present embodiment, as the pattern is formed by a discontinuity on the surface of the metal layer 12 composed metal object 10 itself, there is no risk of withdrawal or detachment of pattern.

[Second Embodiment]

FIG. 6 explains the forming method of the concave 16 in FIG. 3D on the surface of the metal object relate to the present embodiment of the present invention. In the present embodiment, as shown in FIG. 4, two or more multi-layered metal objects laminated as step-wise, as the hardness of the metal layer 12$h$ and 12$g$ become higher, the difference in level h (12$h$) and h (12$g$) become smaller.

However, when a step across over multiple metal layer, size of the steps is determined based on the hardness of each layer and the hardness calculated by considering the percentage of the size of difference in level across the layers. Namely, as the size of the difference in level become higher, calculate the hardness to reflect heavily on the hardness of the layer calculated at the end.

In the present embodiment, as hardness, for example, Vickers hardness may be used.

In addition, in this embodiment, step sizes (12$h$) and s (12$g$) of the steps in the two or more multi-layered metal objects laminated, as step-wise become shorter, the hardness of the metal layer 12$h$ and 12$g$ become higher.

In this case, when each step corresponding to difference in level across multiple layers, the step width is determined based on the hardness of each layer and the hardness calculated by considering the percentage of the size of difference in level across the layers. Namely, as the percentage of the size of the difference in level become higher, calculate the hardness to reflect heavily on the stepsize calculated at the end.

In the present embodiment, as described above, by determining the difference in level and the step size, the amount of the metal layer to move towards laterally of the FIG. 3 in response to the hardness of each metal layer during process of spreading, it is possible to prescribe to have homogeneity to the concave 16 formed by each metal layer ultimately.

Namely, during the process of the spreading, the more the hardness of metal layers are smaller, the more move widely to laterally. Hence, depending on the hardness of the metal layer as stated above, by determining the difference in the step height and the step size, it is possible to homogeneous the internal diameter of the concave 16 formed by each layer after process of spreading.

[Third Embodiment]

In the present embodiment, for example, steps described below are processed prior to the step ST1 shown in FIG. 2

In other words, in shape determination step in the process, calculate the ratio by dividing average of hardness (index value) of the lowest layer of steps of stairs in several metal layer by hardness of the concave formed layer.

Then, shape of the steps configure the concave 16 is determined by the area (the width of the steps) becomes bigger as said ratio becomes bigger.

At this time, there are several steps underneath each steps, calculate the hardness (Index value) based on the hardness of each step and the hardness calculated by considering the ratio of the thickness of the layers in the thickness of the entire underlying. Namely, the hardness is calculated as the hardness of the layer having bigger ration of thickness reflects more to the hardness finally calculated.

Then, step ST4 shown in FIG. 2, the concave 16 is formed to become the shape determined above.

Namely, when the process of spreading, the amount of each metal layer spreads towards laterally (the direction of orthogonal to the direction of the thickness) in FIG. 3, is closely related to the hardness of the metal layer located in the lower layer of the metal layer. Low hardness metals compared to the lower layer of the metal layer, increases the amount of spread towards laterally.

In the present embodiment, to form the concave 16 as stated above, when the spreading in step ST5, metal layers with high amount of spread (low hardness) towards laterally in FIG. 3 (the direction of orthogonal to the direction of the thickness) make bigger size of step. Therefore it is possible to make the size of the area to form the concave 16 spread another layer and the other layers uniformly.

The present invention is not limited to the embodiments described above, it is also possible to append modifications such as design changes based on the knowledge of those skilled in the art, embodiment with such modifications is also included in the scope of the present invention.

For example, before the multi-layered metal object 14 is spread in the first embodiment, the predetermined amount of the multi-layered metal object 14 can be twisted to predetermined direction to the axis orthogonal to the direction of the metal layer 12 laminated. According to this, it is possible to enhance the aesthetic by layered pattern consisting of metal layer 12 appear on the surface of the multi-layered metal object 14.

When patterns are formed on the multi-layered metal object 14 by using aforementioned method, the patterns at the boundary of the pattern part 18 and the non-pattern part 17 are discontinuous.

In addition, the multi-layered metal object 14 may be 'Mokumegane'. Here, 'Mokumegane' includes the metal object made by the method of forming a predetermined pattern on the laminated several metals with different colors, also includes the metal object decorated with so-called "GURI-BORI".

Related to the embodiments the metal object and the method of forming pattern on the surface of the metal object are applicable to decorative metal items such as rings, pendants, necklaces, earrings, cufflinks, brooches, tie tacks, bangles, buckles, chokers, bracelets, and knives, swords, spoons, jewelry boxes made of precious metal, vases and basins made of precious metal, compacts, watches, smokers articles and so on.

Each drawing indicates the number of the metal plate 11 and the numbers of layers of the metal layer 12 are eight, however numbers are not particularly limited. The metal plate 11, the thickness of the metal layer 12, the number of metals laminated and the thicknesses of the multi-layered metal object 14 after spreading are able to be appropriately change in proportion to what the metal object 10 with pattern formed is processed eventually.

In addition, compressed parts and uncompressed parts of the metal layer 12 are indicated as completely cut off in each drawing. Similarly, the displacement parts and the non-displacement parts in the metal layer 12 are indicated as completely cut off. However, each drawing shows the present invention schematically. Therefore, the present invention is not limited to the shape has been shown, includes displacement parts and non-displacement parts, or compressed parts and uncompressed parts are consolidated.

The invention claimed is:

1. A method for patterning a surface of a metal object comprising:
    a laminating step laminating a plurality of metal plates;
    a junction step jointing the plurality of metal plates to form a multi layer metal object in which a plurality of metal plates are laminated;
    a pattern forming step for removing a surface of the multi layer metal object and forming the concave of a predetermined pattern shape to reach a predetermined metal plate; and
    a forming plane step pressing the surface of a non-pattern part of the multi layer metal object and making the surface height of the concave and the surface height of the non-pattern part uniform,
    wherein the pattern forming step forms the concave to reach a lower metal layer among the plurality of metal plates as the concave approaches inward from the stepped outside.

2. A method for patterning a surface of a metal object as set forth in claim 1,
    wherein the pattern forming step forms the concave so that the step height of the concave becomes smaller as the hardness of the metal layer forming the step becomes higher.

3. A method for patterning a surface of a metal object as set forth in claim 2,
    wherein the pattern forming step forms the concave so that the step width of the concave becomes smaller as the hardness of the metal layer forming the step becomes higher.

4. A method for patterning a surface of a metal object as set forth in claim 3, further comprising
    a step shape determination step for calculating a ratio by dividing an index value by hardness of the layer where the concave is formed and determine shape of the step so that the area of the step becomes bigger as the ratio becomes bigger, the ratio is calculated based on the hardness of the layer located in the lower layer of a stepped step of the plurality of metal plates,
    wherein the pattern forming step forms the concave so that the step is formed in the shape determined by the step shape determination step.

5. A method for patterning a surface of a metal object as set forth in claim 3,
    wherein the jointing the plurality of metal plates in the junction step is performed by diffusion joining or solder junction of the metal plates.

6. A method for patterning a surface of a metal object as set forth in claim 3, further comprising a twist step twisting the meal plates around an axis at right angles to the laminating direction of the metal plate.

7. A method for patterning a surface of a metal object as set forth in claim 3, wherein the pattern includes at least one of a letter, a sign and figure.

* * * * *